(12) United States Patent
Thomson et al.

(10) Patent No.: US 9,378,274 B2
(45) Date of Patent: Jun. 28, 2016

(54) OBJECT FILTERING IN A COMPUTING NETWORK

(71) Applicant: Cisco Technology, Inc., San Jose, CA (US)

(72) Inventors: Allan Thomson, Pleasanton, CA (US); Nancy Cam-Winget, Mountain View, CA (US); Vanaja Ravi, San Jose, CA (US); Pok Wong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 13/913,623

(22) Filed: Jun. 10, 2013

(65) Prior Publication Data

US 2014/0365512 A1 Dec. 11, 2014

(51) Int. Cl.
*G06F 17/30* (2006.01)
(52) U.S. Cl.
CPC ...... *G06F 17/30699* (2013.01); *G06F 17/3089* (2013.01); *G06F 17/30867* (2013.01)
(58) Field of Classification Search
CPC ................................................. G06F 17/30575
USPC ........................... 707/752, 754, E17.108, 769
See application file for complete search history.

(56) References Cited

U.S. PATENT DOCUMENTS

| | | | |
|---|---|---|---|
| 6,750,864 B1 * | 6/2004 | Anwar .............. | G06F 17/30489 345/440 |
| 7,477,747 B2 | 1/2009 | Stieglitz et al. | |
| 7,558,960 B2 | 7/2009 | Cam Winget et al. | |
| 7,602,746 B2 | 10/2009 | Calhoun et al. | |
| 7,627,500 B2 * | 12/2009 | Zhang et al. .................. | 705/26.3 |
| 7,640,430 B2 | 12/2009 | Zhou et al. | |
| 7,672,500 B2 * | 3/2010 | Albeck et al. ................. | 382/141 |
| 7,783,520 B2 * | 8/2010 | Zhang et al. .................. | 705/26.1 |
| 7,860,749 B2 * | 12/2010 | Subramanian ............... | 705/26.3 |
| 7,882,349 B2 | 2/2011 | Cam-Winget et al. | |
| 7,966,489 B2 | 6/2011 | Cam-Winget et al. | |
| 8,127,252 B2 * | 2/2012 | McKeon ............... | G06F 9/4443 715/853 |
| 8,191,144 B2 | 5/2012 | Cam Winget et al. | |
| 8,327,432 B2 | 12/2012 | Wong et al. | |
| 8,365,256 B2 | 1/2013 | Wong et al. | |
| 8,601,025 B1 * | 12/2013 | Shajenko et al. ............. | 707/778 |
| 2001/0003455 A1 * | 6/2001 | Grobler ............ | G06F 17/30398 345/418 |
| 2005/0097084 A1 * | 5/2005 | Balmin ............. | G06F 17/30457 |
| 2005/0097317 A1 * | 5/2005 | Trostle et al. ................. | 713/163 |
| 2006/0004647 A1 * | 1/2006 | Srinivasamurthy et al. .... | 705/37 |
| 2006/0004648 A1 * | 1/2006 | Singh et al. ..................... | 705/37 |
| 2006/0004649 A1 * | 1/2006 | Singh ............................. | 705/37 |
| 2006/0059567 A1 * | 3/2006 | Bird et al. ....................... | 726/27 |
| 2006/0248045 A1 * | 11/2006 | Toledano et al. ................ | 707/2 |
| 2007/0094060 A1 * | 4/2007 | Apps et al. ......................... | 705/7 |
| 2010/0031369 A1 * | 2/2010 | Grummt ......................... | 726/27 |

* cited by examiner

*Primary Examiner* — Baoquoc N To
(74) *Attorney, Agent, or Firm* — Edell, Shapiro & Finnan, LLC

(57) ABSTRACT

Presented herein are object filtering techniques that optimize the communication of information over an infrastructure that supports publish-subscribe (pub-sub) and direct query (synchronization) communication. In the object filtering techniques, a single information publisher can share that information in an associated object graph with many different consumers over the infrastructure without sharing the entire object graph.

20 Claims, 6 Drawing Sheets

OBJECT FILTERING IN A COMPUTING NETWORK

TECHNICAL FIELD

The present disclosure relates to object filtering.

BACKGROUND

There are many different networking devices, applications, services, servers, etc. (collectively referred to herein as network components) available from different vendors that perform various operations within a computing network. In order for these various network components to perform their operations, the components often obtain information/data from one or more other sources (e.g., other networking devices, applications, services, servers, mobile devices, etc.).

Different types of information may be produced or used by different network components. In one example, this information includes security information. Security information may include, but is not limited to: raw security events, network flow information, identity information, security configuration information, security intelligence information, reputation information, correlated security analysis, and security reports. Security information may also include: indexes of information, policy, configuration settings, topology (physical, layer 2, and/or layer 3), network flow information, deep packet inspection of data and control plane traffic, control plane events, content security events, policy (e.g., network, control, endpoint), posture assessment information, compliance rules and assessment, profiling assessment information, statistical counts and analysis of the statistics on traffic patterns, etc.

DESCRIPTION OF EXAMPLE EMBODIMENTS

Overview

Presented herein are object filtering techniques that optimize the communication of information over an infrastructure that supports publish-subscribe (pub-sub) and direct query (synchronization) communication. In the object filtering techniques, a single information publisher can share information in an associated object graph with many different consumers over the infrastructure without sharing the entire object graph.

Example Embodiments

The object filtering techniques presented herein enable a publisher of an object graph to support multiple consumer views/filters of that published object graph in a way that allows those multiple consumer views to be supported by a single object graph. Instead of a publisher constructing and distributing different versions of the same object graph (and associated attributes) from the published source to each consumer that requires a different object view, the object filtering techniques allow the infrastructure that connects the publisher to the consumers to become aware of the object filters in use and filter those object graphs based on where the consumers are connected to the grid. Additionally, the object filters requested by consumers from a published object graph are authorized by a policy system such that only allowed object attributes and relationships are accessible by authorized consumers. This authorization is enforced by the intervening infrastructure implementing the consumer's object filter, rather than the publisher having to understand policy that gets applied everywhere.

In accordance with examples presented herein, the object filtering techniques may be implementable across any communication protocol that supports pub-sub and/or direct query patterns between a source of information (publisher) and a destination of the information (consumer) where the protocol exchanges between source and destination are controlled by a separate control plane entity, referred to herein as a grid controller. The communication fabric can be any network connection infrastructure where the messages sent over that communication fabric are first authorized by the associated controller. Object filtering enables the publisher to maintain a single object graph while allowed views of that object graph are provided to different consumers based on policy as well as desired subsets of the object graph.

Figure 1:
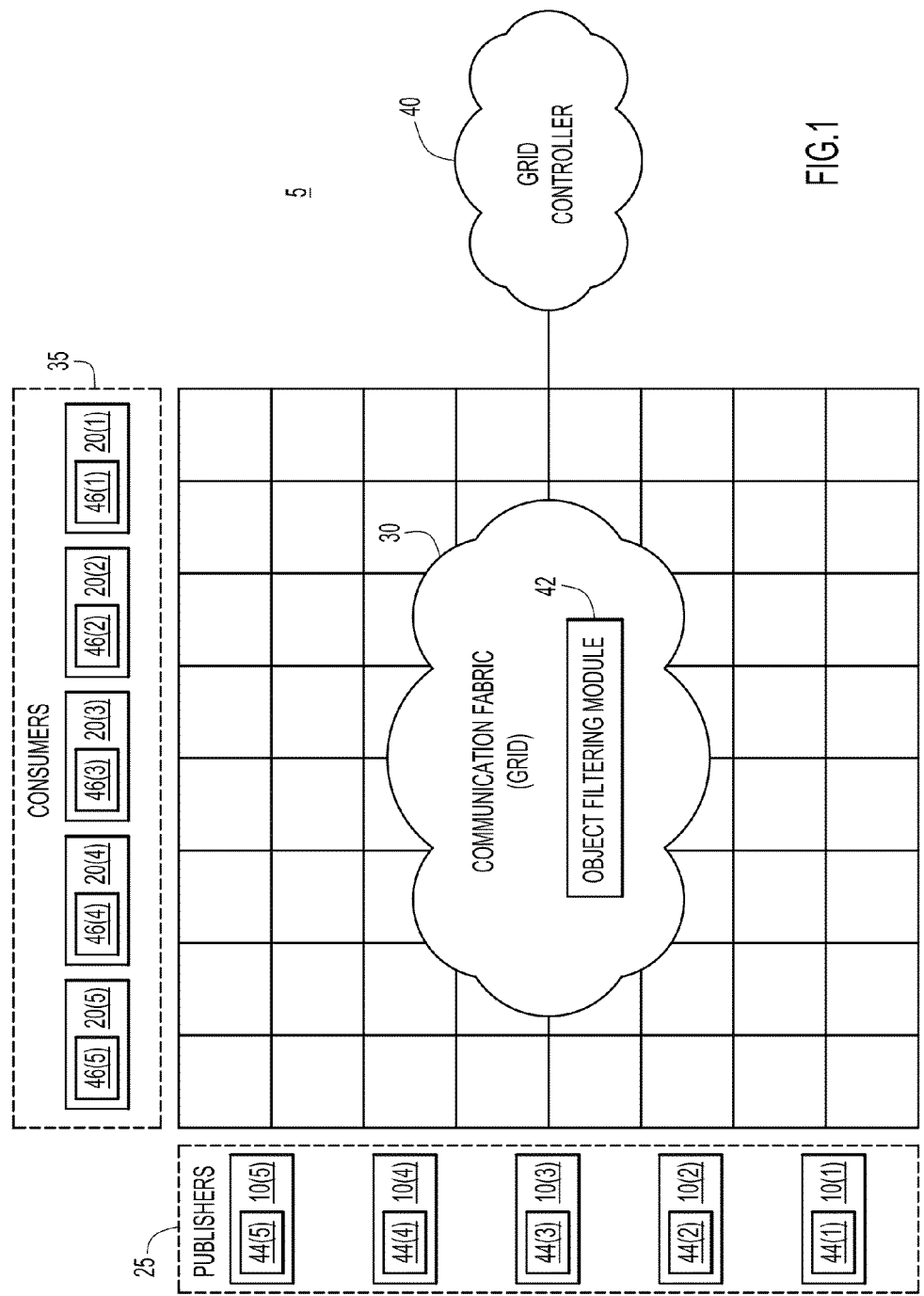
FIG. 1 is a schematic diagram of a computing network in which object filtering techniques in accordance with examples presented herein may be implemented.

FIG. 1 is a schematic diagram of a computing network 5 in accordance with examples presented herein that comprises multiple network components (e.g., networking devices, applications, services, servers, etc.) that span physical, network and security infrastructures. More specifically, computing network 5 comprises a first plurality of network components 10(1)-10(7) and second plurality of network components 20(1)-20(7). Network components 10(1)-10(7) and 20(1)-20(7) may take a number of different forms and, may include, for example, services, archives, network security devices (e.g., compliance check service, firewalls, etc.), wireless local area network (WLAN) controllers, access points, policy enforcement services, network management software, servers (virtual private network (VPN) termination servers, video servers, etc.), clients, etc.

In the example of FIG. 1, network components 10(1)-10(7) are components that are configured to generate data/information that is useable by other network components. As such, these network components 10(1)-10(7) are collectively and generally referred to as publishers or producers 25. Additionally, network components 20(1)-20(7) are components that are configured to use (consume) data/information generated by other network components. As such, these network components 20(1)-20(7) are collectively and generally referred to as consumers 35.

The computing network 5 also comprises a communication fabric 30 that enables the publishers 25 to share information in a comprehensive manner with the consumers 35. The communication fabric 30, which is sometimes referred to herein as a grid infrastructure or simply "grid," is a logical arrangement of hardware/software elements implemented in one or more interconnected computing devices (e.g., servers, controllers, switches, routers, firewalls, access points, etc.) that collectively function as a logical communication bus linking the discrete network components 10(1)-10(7) and 20(1)-20(7).

All of the hardware/software elements in the grid 30 connect abstractly to a control plane entity, referred to herein as a grid controller 40. The grid controller 40 may comprise a software application executed by one or more servers (e.g., Xen Cloud Platform (XCP) servers). In general, the grid controller 40 provides the control plane of the grid 30. The grid controller 40 is also configured to authenticate and authorize network components 10(1)-10(7) and 20(1)-20(7) to the grid 30. Furthermore, the grid controller 40 is configured to enable the exchange of information between publishers 25 and consumers 35. These exchanges may include multicast (e.g., publication-subscription (pub-sub)) and unicast/query (i.e., peer-to-peer) information exchanges across the grid 30.

In computing networks, "objects" are, in essence, data structures coupled with their associated processing routines. An object can be a variable, function, data, etc. For example, a file is an object because it is a collection of data that is coupled with read and write routines for that data. A "class" describes a group of objects (instances) with, for example, similar properties (attributes), common behavior (operations), common relationships to other objects, and/or common meaning (semantics). An "object graph" is a tree of objects and their attributes. Each node in the object graph is connected by a relationship. Whereas a normal data model (e.g., a Unified Modeling Language (UML) Class diagram) details the relationships between classes, the object graph relates their instances and may include a plurality of objects. In certain cases, a fairly large connected object graph of object relationships may occur, where each object is related to other objects either by a parent-child (containment) relationship or a reference (refers-to or is-referred-to-by) relationship. In certain circumstances, an information consumer may only be interested in certain aspects of the object graph of a publisher, rather than the complete graph and all objects the publisher has to offer. This is particularly the case when contextual information from a single network component is shared with many different consumers of that information in different ways and for different purposes.

For example, a user may be represented by: (1) a set of attributes and a set of session object instances; (2) a set of network flows associated with the user; (3) the set of interfaces a user is on; etc., all of which belong to an object graph on a first networking component. Another networking component may only be interested in the user's immediate attributes and not all related objects in the object graph. Additionally, the usefulness of some attributes decreases with time. As such, it is beneficial to relay those types of attributes with priority; while other attributes can be archived and retrieved at a later time without consequences. Presented herein are object filtering techniques that optimize the communication of information over grid 30 such that a single publisher can share an object graph with many different consumers without sharing the entire published object graph. The object filtering functionality is embodied in an object filtering module 42 of the grid 30 that operates in conjunction with object filtering agents 44(1)-44(5) of publishers 25 and object filtering agents 46(1)-46(5) of consumers 35. The object filtering functionality of object filtering module 42 may span multiple entities forming the grid 30.

In examples presented herein, a publisher, such as publisher 10(1) in FIG. 1, defines an object graph and exposes data based on that object graph (i.e., the publisher has a set of objects that allows consumers to access via subscription or query). The object graph may be defined in any schema based language including, for example, Extensible Markup Language (XML), JavaScript Object Notation (JSON), Structured Query Language (SQL), Access Service Network (ASN), etc.

In operation, a first consumer, such as network component 20(1), requests to obtain information based on an object filter (F1). A second consumer, such as network component 20(2), requests to obtain information based on an object filter (F2). In other words, the consumers subscribe to or query the information based on object filters. An object filter may be defined in XML schema and can be used for both pub/sub as well as query messages. The object filter can also define which relationships to traverse or not. If the relationship is traversed then it can also specify whether to return the object contents themselves or an object reference rather than the object itself.

For a consumer to request information from an object graph, the consumer should be first authorized to access that relationship between two nodes in the graph. This authorization policy is defined at the grid controller 40, but referred to by each intervening node (i.e., the distribution network in the case of a pub-sub event or directly by the publisher if it is a directed query from consumer to the publisher directly).

Authorization refers to the allowance or denial of a consumer to access part of the object graph. For example, Obj1→Child1 & Obj1→Peer1 is an object graph with two relationships from a single Obj1. A first consumer is allowed to access Obj1→Child1 relationship, but not Obj1→Peer1 relationship. A second consumer is allowed to access all relationships from Obj1. As such, in this example, when the first consumer submits an object filter that allows all relationships to be accessed from the publisher, the grid infrastructure checks that all relationships are accessible by the first consumer. This is implemented by the node transmitting the event matching the object filter and it knows that the first consumer is only allowed to access the Obj1→Child1 relationship. As such, the node will construct a version of the object only containing that allowed relationship(s) and not the other relationship(s).

In general, the grid controller 40 also has the opportunity, through provisioned policy, to set which aspects of the object graph are exposed by a publisher to which consumers. More specifically, the grid controller 40 is where the object graph access rules are defined. When a consumer subscribes to a publisher, the publisher can consult the policy defined at the grid controller 30 for what that consumer is allowed to access when the object graph is published based on the object filter. Therefore, if the filter the consumer requested identifies broader access than allowed by the grid controller's policy, the publisher can restrict the publication to only include the object's attribute that are allowed by policy.

Object filtering may occur by attributes/syntax or filtering by value of the object attributes. Filtering by value means that an object's attributes are matched based on value of the attributes. Filtering by value allows the system to filter events based on the content of the event. For example, there may be 10 VLAN objects and a consumer only wants to get notifications for a first VLAN (VLAN1) instead of all 10. The object filter would be specified by the consumer to request notifications only for VLAN1.

Filtering by syntax means that an objects attributes are matched based on the relationship/meta model of the object and not the actual value. Filtering by syntax allows the system to filter event structure. For example, there may be an object with two attributes (object.attr1 and object.attr2). The filter by syntax from a consumer that is only interested in attr1 would request that one attribute so when it gets the object it only gets object.attr1 instead of both attributes belonging to the object. This filter operates based on the structure of the object rather than the value of the attributes themselves.

In accordance with examples presented herein, the object filters and object graphs can also help in the routing and caching of information along the path between the publisher and the consumer. In particular, object filtering may occur within the grid 30 for improved scalability. In one example, the original publisher might publish only one full version of the object graph, but three layers into the distribution of pub-sub the object filter gets applied. Therefore, instead of the publisher publishing different portions of the object graph for different consumers, the object filtering within the grid 30 results in different portions of the object graph being provided to different interested consumers. Object filtering may, accordingly, occur throughout the grid 30 and may be based on where the consumer is in the logical topology of the network.

In one example, a publisher receives a subscription for an object graph from a consumer. The publisher requests the policy for the consumer and the object graph requested from the grid controller 30. The grid controller 30 returns the policy/policies and the publisher generates events. Each event is matched against a policy for the consumer to which the event is sent. The publisher may filter object events based on what portions of the object graph the consumer is allowed to receive. In this example, the publisher performs the object filtering. The grid controller 30 acts as the policy repository and the publisher looks up the policy from the controller.

In another example, a publisher receives a subscription for an object graph from a consumer. The publisher generates events and sends to nodes within the grid 30 (e.g., XMPP nodes). An intermediate node within the grid 30 may receive the event(s) and identify what consumers are connected thereto. The intermediate node may look up policy/policies associated with the object graph and the consumers receiving events. The intermediate nodes then filter the object events based, for example, on what portions of the object graph the consumer is allowed to receive. In this example, the grid 30 (i.e., intermediate nodes) perform the object filtering. The grid controller 30 acts as the policy repository and the intermediate nodes look up the policy from the controller.

In certain circumstances, a publisher may send a pointer, rather than actual information to a consumer. When the consumer receives such a pointer, the consumer may decide to do a direct query for that content pointed to by the pointer or lookup a cache of the content. In certain examples, the reason for the pointer is that it indicates content that doesn't change much over events so events may repeat the same pointer instead of repeating longer content at each event. In certain examples, a publisher may publish an event with a pointer. The consumer receives the event and pointer, and looks up a local cache for the content matching the pointer (i.e., a cache with the grid 30). If the content is already available, it may be used or a direct query to get the content may be initiated. The content may be saved in a local cache for use after the next event.

Figure 2:
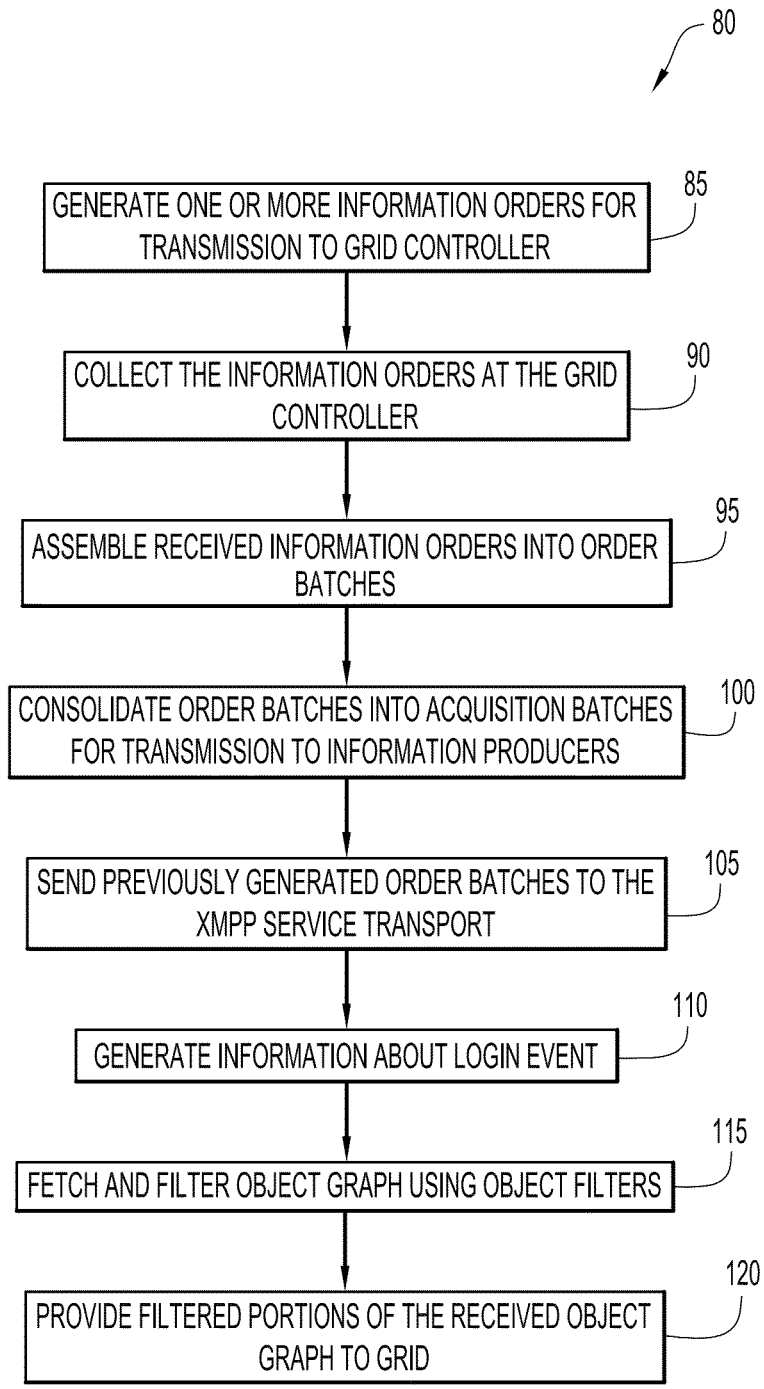
FIG. 2 is a flowchart illustrating object filtering techniques in accordance with examples presented herein.
Figure 3:
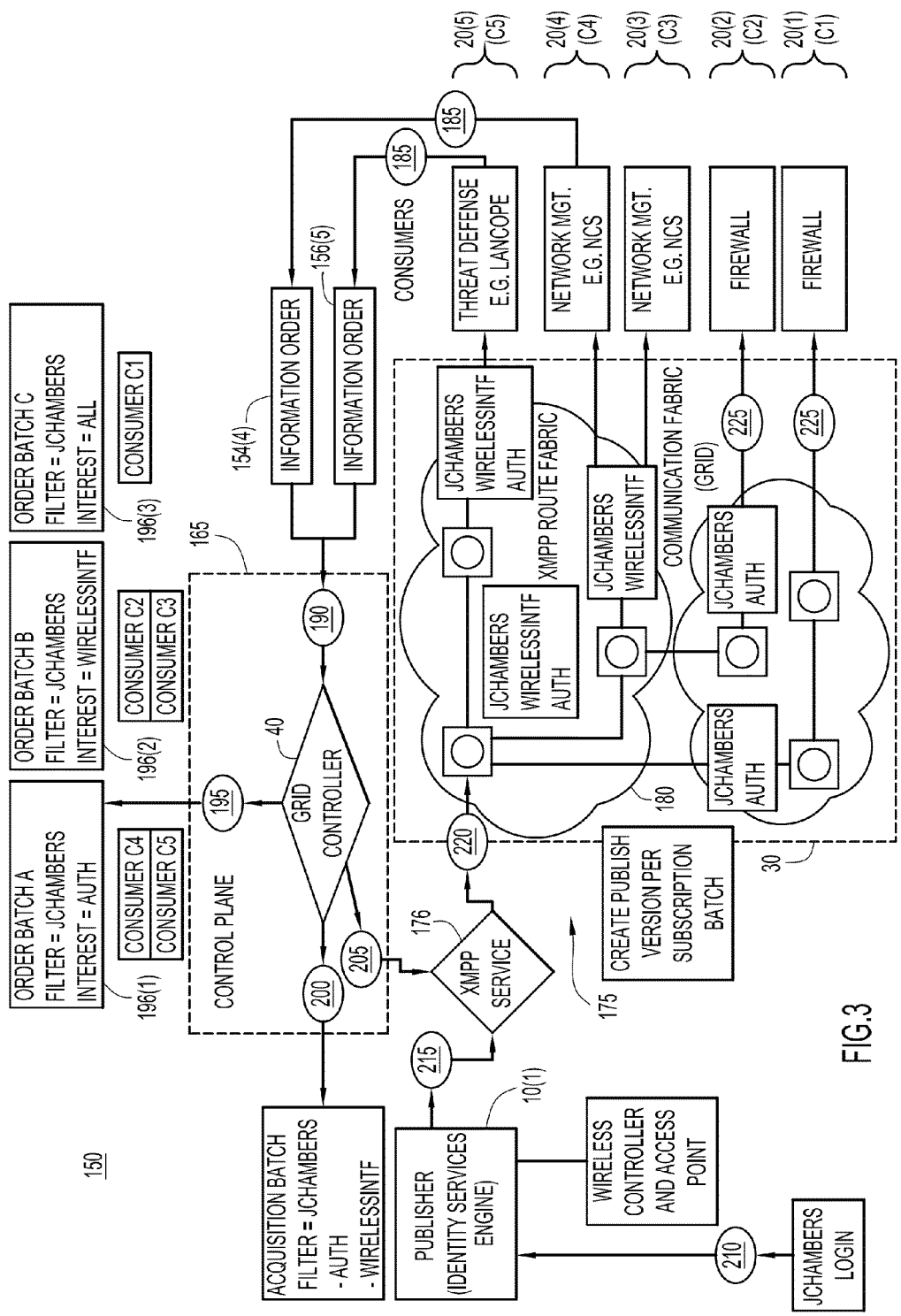
FIG. 3 is a schematic diagram of a computing network executing object filtering techniques.

FIG. 2 is a flowchart of a simplified example method 80 in accordance with examples presented herein. FIG. 3 is a simplified diagram schematically illustrating the performance of the operations of method 80 of FIG. 2 within part of the example computing network 5 of FIG. 1. The portion of computing network 5 shown in FIG. 3 includes a plurality of information consumers 20(1)-20(5) (referred to as C1-C5, respectively), a publisher 10(1), a control plane 165 comprising a grid controller 40, and a data plane 175 comprised of grid 30. In the example, of FIG. 3, the grid 30 comprises an Extensible Messaging and Presence Protocol (XMPP) route fabric 180.

In accordance with examples presented herein, object filters are used so that the publisher 10(1) can efficiently provide data to interested consumers (e.g., one or more of consumers 20(1)-20(5)). As described above, the object filters can be used for both pub-sub communications as well as query (peer-to-peer) communications. The object filtering may, in certain circumstances, be performed at the publisher 10(1) or performed within the grid 30. In accordance with certain examples presented herein, an object filter may define which relationships or attributes to traverse or not. If a relationship is traversed, then it can also specify whether to return the object contents themselves or an object reference rather than the object itself.

FIGS. 2 and 3 illustrate an example that uses one specific object graph in which a user object has a number of relationships. In the example object graph, the user has a list of associated identifiers (e.g., employeeID=0002, realName="JChambers"), and the user has a list of associated network sessions from his/her various computing devices (e.g., network sessions for the user's smartphone, tablet, desktop computer, laptop computer, etc.). Each network session in turn has a few relationships, including, for example, what interface is used, what authentication checks are done to establish that session, etc. The interface has the relationships of whether it is a wired or wireless interface. If the interface is a wired interface, then it may have further have a port relationship, while a wireless interface may further have a Service Set Identifier (SSID) relationship. This collection of information forms the object graph that may be defined at a publisher, in this case publisher 10(1).

Initially, a firewall or other physical security application may be interested in learning that "JChambers" has been authenticated at the office as fulfilling a prerequisite for his subsequent access to network resources and doors. These gating applications would filter specifically for events pertaining to "JChambers." As such, method 80 of FIG. 2 begins at 85 where one or more consumers, in this case information consumers 20(4) and 20(5), attempt to consume interested data based on a predefined object filter. More specifically, the information consumers 20(4) and 20(5) will generate "information orders" 156(4) and 156(5), respectively, that each indicates a subscription/query (i.e., requested information) and an object filter. These information orders are then transmitted to the grid controller 40. The transmission of information orders by consumers 155(4) and 155(5) to grid controller 40 is schematically shown in FIG. 1 by references 185.

Network components that consume user information may be interested in different types of information (i.e., different parts of a data object), depending on the role/function of the consuming component. For example, certain network components manage the network infrastructure. Such components consume information that assists in management of service capacity and overall network experience (e.g., information indicating how physically the users' sessions are connected to the network, the port or SSID), but are not interested in other information, such as, for example, authentication mechanism information. Other network components that protect the network and physical resources (e.g., Firewalls and physical security applications) consumer authentication/authorization information regarding the sessions to make traffic forwarding or dropping decisions, but may not be interested in how the session is connected onto the network. Additionally, network threat defense applications consume information regarding how the user is authenticated as well as how the physical connection is made. In general, the information order includes information that specifies the specific information via, for example, an object filter identifier.

Returning to FIG. 2, at 90 the grid controller 40 collects the information orders 156(4) and 156(5) as well as any other information orders transmitted from other consumers. This is done before data is provided to the grid 30 (by publishers) or any data is consumed. The collection of the information orders is shown in FIG. 3 by reference 190.

At 95, the grid controller 40 may assemble received information orders 156(4) and 156(5) into an "order batch." More specifically, the grid controller 40 is configured to create an order batch and make a list of the multiple consumers that are interested in the same information. The generation of an order batch is shown by reference 195 in FIG. 3. Since different consumers may be interested in the same or different information, the grid controller 40 may generate multiple order batches, shown in FIG. 3 as order batches 196(1)-196(3). The order batches 196(1)-196(3) include object filters so the publishers of the information will only return the items requested by consumers.

At 100 of FIG. 2, the grid controller 40 consolidates order batches into "acquisition batches" for transmission to publishers. The generation of an acquisition batch is shown in FIG. 3 by reference 200. In general, a single request operation is used to fetch all of requested information. This differs from existing client-server models where a server would respond to uncoordinated individual requests from multiple clients, such as web services (e.g., Representational State Transfer (REST), Simple Object Access Protocol (SOAP), etc.) that heavily load the database. This approach eliminates the wastefulness in duplicated requests and improves scalability. This optimization produces significant cumulative savings as data is repeatedly published or queried.

At 105, the grid controller 40 also sends the previously generated order batches to the XMPP service transport 176. This operation is shown in FIG. 3 by reference 205. The XMPP service transport 176 is the delivery infrastructure that will edit and reassemble the data sent by the publishers into versions according to the order batches. The XMPP service transport 176 pushes the information to the consumers through the XMPP routing fabric 180. In general, the information is routed and multicast such that the main trunk or station will have the entire object graph. As the information fans out and gets closer to the end consumer, the delivery content becomes more specific for the route and consumer, where only content that will be consumed will be delivered on the leaf route. A routing table of what content is designated along the path is maintained to route the data, in a similar fashion as in network traffic routing.

As such, in examples presented herein, different portions of shared object graphs may be cached at different devices, sometimes referred to as intermediate nodes, within the XMPP routing fabric 180. Instead of sending all information in an object graph to each consumer, publisher 10(1) may provide, using object filters, various pieces/portions of the object graph to different intermediary nodes. Alternatively, the grid 30 (i.e., intermediate nodes) perform the object filtering. The consumers may then retrieve the object graph portions from intermediate nodes. Additionally, when the unique information changes in an object graph changes, the publisher 10(1) is configured to only send those unique changes to the intermediate node.

In the example of FIGS. 2 and 3, when the user "JChambers" logs in (shown in FIG. 3 by reference 210), an Identity Service Engine (ISE) authenticates "JChambers" on to the wireless network. As such, in the method of FIG. 2, the ISE, which is publisher 10(1), adds information about "JChambers" login event to the object graph of the publisher 10(1).

In the example of FIG. 2, "JChambers" login event results in, at 115, the fetching of {jchambers, auth, wirelessintf} information from the object graph of publisher 10(1) and filtering for information pertaining to the log in event. Next, at 120, a filtered portion or portions of the object graph is sent to the grid 30. The fetching and filtering of the object graph is shown in FIG. 3 by reference 215, while the sending of the object graph portion to the XMPP route fabric is shown by reference 220.

At 225, the received portion of the object graph (e.g., {jchambers, auth}) that is specific for consumers may be sent to those consumers. In the example of FIG. 3, the authentication of "JChambers" may be relevant for, for example, firewalls 155(1) and 155(2) and these firewalls receive object graph portions. This is shown in FIG. 3 by references 225.

FIGS. 2 and 3 illustrate examples in which the publisher 10(1) performs object filtering. As noted, in accordance with examples presented herein, the object filtering may occur at intermediate nodes, rather than at the publisher.

As noted, in accordance with examples presented herein, the object filtering can also enable caching of information along the path between a publisher and the consumer(s). In one example, if "JChambers" has a new session but the new session is using the same SSID as before, there is no need to resend the full details. If "JChambers" logs in again with the authentication method changed from a full authentication to lookup (i.e., "fast resume"), or from Protected Extensible Authentication Protocol (EAP-PEAP) to Extensible Authentication Protocol-Transport Layer Security (EAP-TLS) after a certificate provisioning, there is no need to resend the entire graph. Rather, only a changed or delta portion is transmitted.

Relating to the optimization by using filters above, objects and attributes that are of immediate interest and timeliness needs to a consumer may be cached closer to the consumer. Change sets that update the cache are propagated from the publisher to the consumer. Only objects and attributes that are marked for fast track priority are cached in the above manner. Objects and attributes that have no immediate need may be archived and transmitted on demand.

Figure 4:
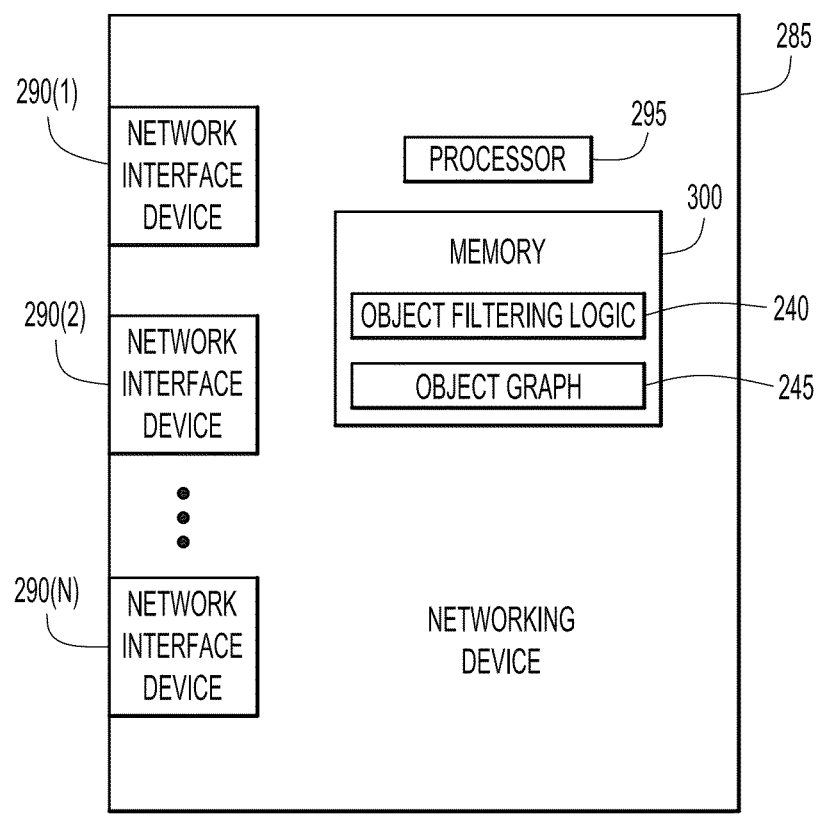
FIG. 4 is a schematic block diagram of an intermediate node of a communication fabric in accordance with embodiments presented herein.

FIG. 4 is a block diagram illustrating one example of a networking device 285 operating as an intermediate node (i.e., an entity within a communication fabric) that is configured to perform object filtering techniques. As shown, networking device 285 comprises a plurality of network interface devices 290(1)-290(N), a processor 295, and a memory 300. Memory 300 includes object filtering logic 240 and an object graph 245 received from a publisher.

Memory 300 may comprise read only memory (ROM), random access memory (RAM), magnetic disk storage media devices, optical storage media devices, flash memory devices, electrical, optical, or other physical/tangible memory storage devices. The processor 295 is, for example, a microprocessor or microcontroller that executes instructions for the object filtering logic 240. Thus, in general, the memory 300 may comprise one or more tangible (i.e., non-transitory) computer readable storage media (e.g., a memory device) encoded with software comprising computer executable instructions and when the software is executed (by the processor 295) it is operable to perform the object filtering operations described herein.

Figure 5:
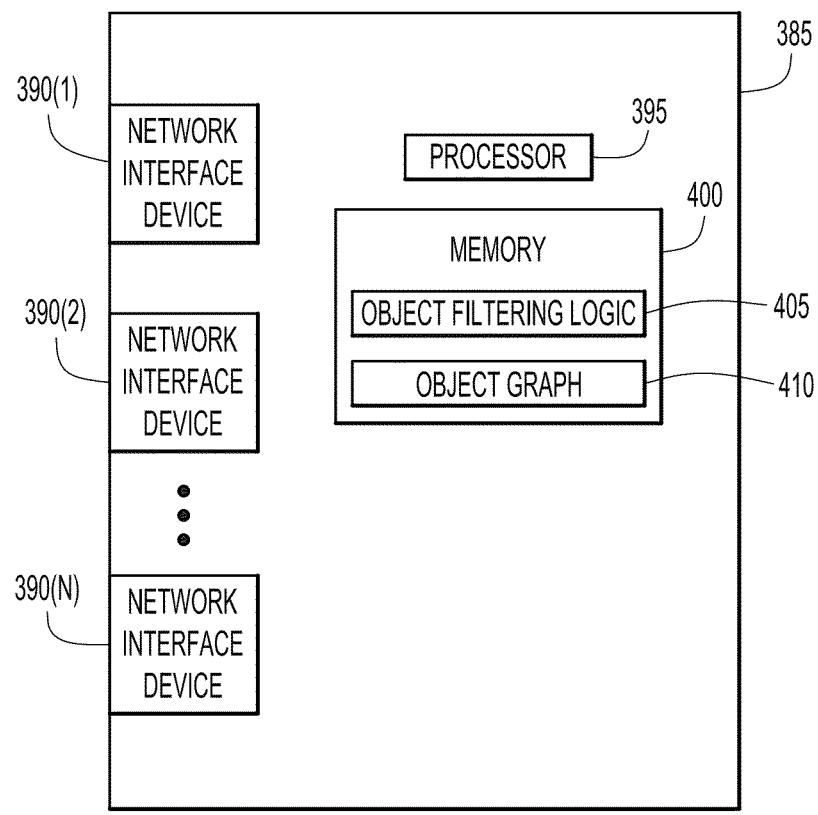
FIG. 5 is a schematic block diagram of a publisher in accordance with embodiments presented herein.

FIG. 5 is a block diagram illustrating publisher 385 in accordance with examples presented herein. As shown, publisher 385 comprises a plurality of network interface devices 390(1)-390(N), a processor 395, and a memory 400. Memory 400 includes object filtering logic 405 and an object graph 410.

Memory 400 may comprise read only memory (ROM), random access memory (RAM), magnetic disk storage media devices, optical storage media devices, flash memory devices, electrical, optical, or other physical/tangible memory storage devices. The processor 395 is, for example, a microprocessor or microcontroller that executes instructions for the grid object filtering agent logic 405. Thus, in general, the memory 400 may comprise one or more tangible (i.e., non-transitory) computer readable storage media (e.g., a memory device) encoded with software comprising computer executable instructions and when the software is executed (by the processor 395) it is operable to perform the object filtering operations described herein.

Figure 6:
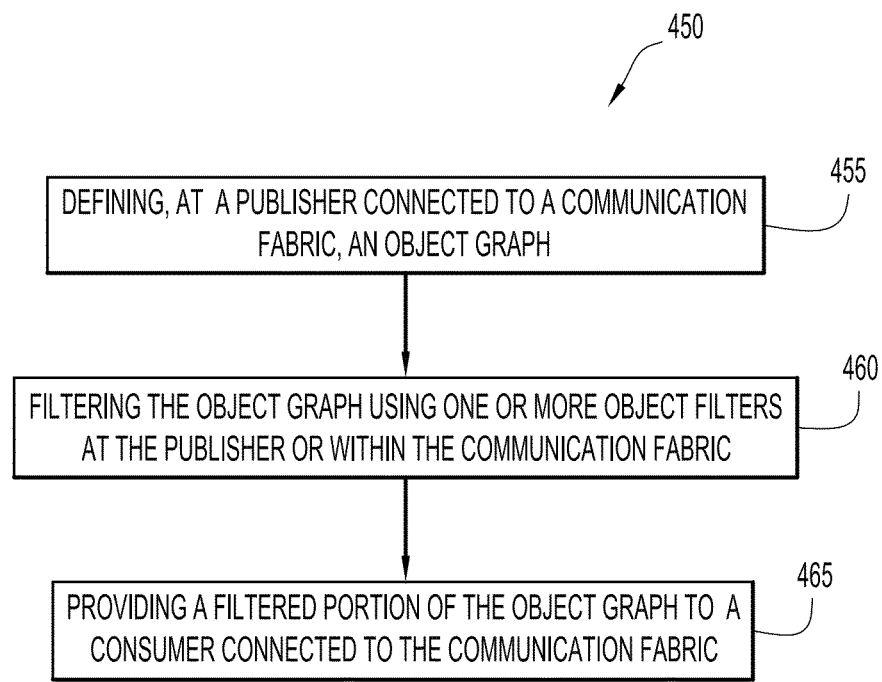
FIG. 6 is a high-level flowchart of operations performed in accordance with examples presented herein.

FIG. 6 is a high level flowchart of a method 450 in accordance with embodiments presented herein. The method 450 begins at 455 where a publisher connected to a communication fabric (e.g., an XMPP infrastructure) defines an object graph. At 460, the publisher or nodes within the communication fabric filter(s) the object graph using one or more object filters. At 465, filtered portions of the object graph are provided to a consumer connected to the communication fabric.

As noted, presented herein are techniques that optimize the communication of the information over a communication fabric such that a single publisher of information can share that information with many different consumers without sharing the entire object graph. The techniques presented herein are useable to share relationships, but also which attributes are included in the object, therefore providing full flexibility as to what level of object detail is transmitted over the communication fabric. The techniques may use XML schema to communicate object graph filtering schemes without requiring different models of the same objects just to allow different traversal of those objects by different consumers. The techniques also enable a single publication of information into the communication fabric that may be consumed by different end network components. The communication fabric is also used to manage the subscriptions/queries for optimized data communication. In certain examples, it is possible to have authorization of particular elements of the object graph for different consumers so that not only does filtering get done based on the requestor, but also policy can be applied to set which consumer sees the objects (e.g., when used with a controller which is in the path of the request/subscription).

The above description is intended by way of example only.

What is claimed is:

1. A method comprising:
   defining an object graph comprising a plurality of nodes at a publisher network component connected to a communication fabric, wherein the communication fabric comprises an arrangement of interconnected computing devices;
   receiving, from a consumer network component connected to the communication fabric, a consumer request for information from the object graph, wherein the consumer request includes an object filter associated with the information that defines which relationships between nodes in the object graph to traverse or not traverse when the information is provided to the consumer network component;
   accessing one or more policies that indicate which portions of the object graph the consumer network component is allowed to access when the object graph is published based on the object filter;
   determining, based on the one or more policies, that the consumer request is a request for access that is broader than the access allowed by the one or more policies;
   filtering, at the publisher network component or within the communication fabric, the object graph using the object filter to generate a filtered portion of the object graph; and
   restricting publication of the filtered portion of the object graph to include only portions allowed by the one or more policies.

2. The method of claim 1, further comprising:
   determining that the consumer network component is unauthorized to access one or more of the relationships defined in the object filter; and
   constructing a version of the filtered portion of the object graph that includes the portions allowed by the one or more policies and only allowed relationships, and which omits the one or more relationships that the consumer network component is unauthorized to access.

3. The method of claim 1, wherein filtering the object graph comprises: filtering by syntax.

4. The method of claim 1, wherein the one or more policies are defined at a controller connected to the communication fabric.

5. The method of claim 1, wherein receiving the consumer request comprises:
   receiving a request to subscribe to information published by the publisher network component.

6. The method of claim 1, wherein receiving the consumer request comprises:
   receiving a query request.

7. The method of claim 1, wherein defining the object graph comprises:
   defining the object graph in a schema based language.

8. The method of claim 1, wherein the consumer request specifies whether to return object contents corresponding to the information or an object reference pointing to a cache that includes the information.

9. The method of claim 1, further comprising:
   providing the object graph to one or more intermediate computing devices in the communication fabric for caching and subsequent distribution of portions of the object graph to one or more consumer network components.

10. One or more computer readable storage media encoded with software comprising computer executable instructions and when the software is executed operable to:
    define an object graph comprising a plurality of nodes at a publisher network component connected to a communication fabric, wherein the communication fabric comprises a plurality of interconnected computing devices;
    receive, from a consumer network component connected to the communication fabric, a consumer request for information from the object graph, wherein the consumer request includes an object filter associated with the information that defines which relationships between nodes in the object graph to traverse or not traverse when the information is provided to the consumer network component;
    access one or more policies that indicate which portions of the object graph the consumer network component is allowed to access when the object graph is published based on the object filter;
    determine, based on the one or more policies, that the consumer request is a request for access that is broader than the access allowed by the one or more policies;

filter the object graph using the object filter at the publisher network component or within the communication fabric to generate a filtered portion of the object graph; and restrict publication of the filtered portion of the object graph to include only portions allowed by the one or more policies.

11. The computer readable storage media of claim 10, further comprising instructions operable to:

determine that the consumer network component is unauthorized to access one or more of the relationships defined in the object filter; and construct a version of the filtered portion of the object graph that includes the portions allowed by the one or more policies and only allowed relationships, and which omits the one or more relationships that the consumer network component is unauthorized to access.

12. The computer readable storage media of claim 10, wherein the instructions operable to filter the object graph comprise instructions operable to:

filter by syntax.

13. The computer readable storage media of claim 10, wherein the one or more policies are defined at a controller connected to the communication fabric.

14. The computer readable storage media of claim 10, wherein the consumer request specifies whether to return object contents corresponding to the information or an object reference pointing to a cache that includes the information.

15. A system comprising:

a communication fabric comprising a plurality of interconnected computing devices;

a controller for the communication fabric, wherein the controller includes a processor;

a publisher network component connected to the communication fabric and configured to define an object graph; and a consumer network component connected to the communication fabric configured to generate a consumer request for information from the object graph, wherein the consumer request includes an object filter associated with the information that that defines which relationships in the object graph to traverse or not traverse when the information is provided to the consumer network component, and wherein at least one of the publisher network component or the communication fabric is configured to:

access one or more policies that indicate which portions of the object graph the consumer network component is allowed to access when the object graph is published based on the object filter, determine, based on the one or more policies, that the consumer request is a request for access that is broader than the access allowed by the one or more policies, filter the object graph using object filter such that a filtered portion of the object graph to generate a filtered portion of the object graph, and restrict publication of the filtered portion of the object graph to include only portions allowed by the one or more policies.

16. The system of claim 15, wherein one of the publisher network component or the communication fabric is configured to:

determine that the consumer network component is unauthorized to access one or more of the relationships defined in the object filter; and construct a version of the filtered portion of the object graph that includes the portions allowed by the one or more policies and only allowed relationships, and which omits the one or more relationships that the consumer network component is unauthorized to access.

17. The system of claim 15, wherein one of the publisher network component or the communication fabric is configured to use one or more object filters that filter the object graph by syntax.

18. The system of claim 15, wherein the consumer request specifies whether to return object contents corresponding to the information or an object reference pointing to a cache that includes the information.

19. The system of claim 15, wherein the consumer request is at least one of request to subscribe to information published by the publisher network component or a query request.

20. The system of claim 15, wherein interconnected computing devices are configured to cache the object graph for and distribute portions of the object graph to one or more consumer network components.

* * * * *